United States Patent [19]

Colmon et al.

[11] Patent Number: 4,578,102

[45] Date of Patent: Mar. 25, 1986

[54] QUENCHING OR TEMPERING BY MEANS OF A TWO-PHASE JET

[75] Inventors: Daniel Colmon; Bernard Letemps, both of Thourotte, France

[73] Assignee: Saint-Gobain Recherche, Aubervilliers, France

[21] Appl. No.: 637,286

[22] Filed: Aug. 3, 1984

[30] Foreign Application Priority Data

Aug. 5, 1983 [FR] France ................................ 83 12989

[51] Int. Cl.$^4$ ............................................. C03B 27/02
[52] U.S. Cl. ........................................ 65/114; 65/116; 65/348
[58] Field of Search ................... 65/348, 273, 116, 114

[56] References Cited

U.S. PATENT DOCUMENTS 2,265,308  12/1941  Perry et al. ........................... 65/348
2,345,808   4/1944  Green ................................. 65/348 X

FOREIGN PATENT DOCUMENTS 441017  1/1936  United Kingdom .................. 65/114

Primary Examiner—Arthur Kellogg
Attorney, Agent, or Firm—Oblon, Fisher, Spivak, McClelland & Maier

[57] ABSTRACT

The invention relates to thermal quenching or tempering of glass by means of a gaseous jet directed by nozzles.

According to the inventive method, the nozzles are supplied with gas and liquid under a pressure which enables the jet velocity attained at the exit of the nozzles to be at least sonic, said jet being comprised of a mixture of a gas and a finely divided liquid.

In particular the gas may be air and the liquid water.

The invention may be applied to vertical or horizontal quenching or tempering of sheets or other items of glass.

11 Claims, 5 Drawing Figures

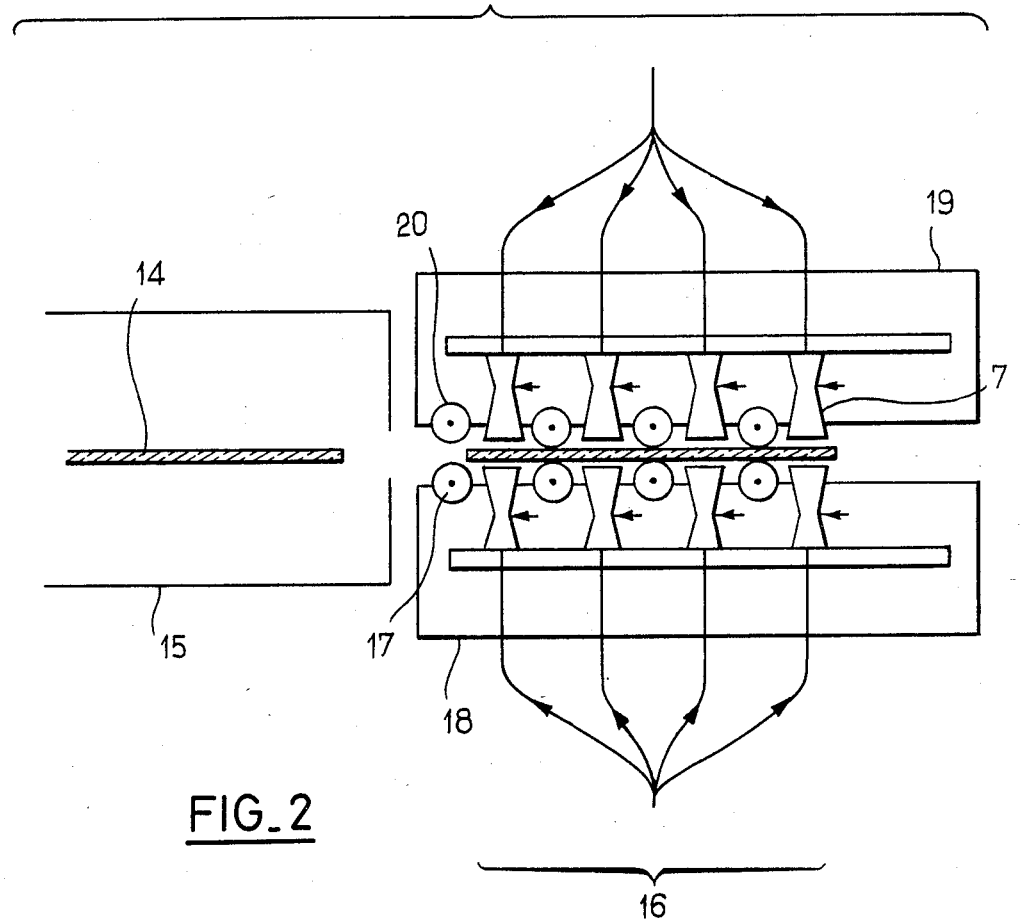
FIG_2
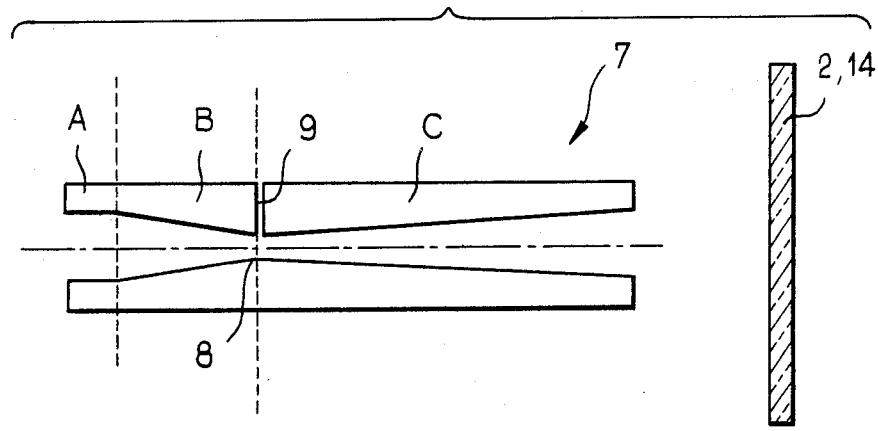
FIG_3a

QUENCHING OR TEMPERING BY MEANS OF A TWO-PHASE JET

BACKGROUND OF THE INVENTION

1. Field of the Invention

The invention relates to thermal quenching or tempering of glass in quenching or tempering installations where the glass is subjected to the action of a gaseous jet.

2. Description of the Prior Art

In general, the invention may relate to either vertical or horizontal quenching or tempering of glass sheets or plates. Current regulations, particularly with respect to automobile window and roof panes, are quite strict so as to ensure an adequate margin of safety to the user. Increasingly effective quenching or tempering techniques are needed to provide a glass having the mechanical characteristics necessary to meet such regulations, in particular Regulation No. 43 which resulted from the U.N. agreement on uniform conditions of government approval and reciprocal recognition of government approval of motor vehicle parts and equipment.

The regulations require that following breakage of the pane, the number of glass fragments contained in a square of $5 \times 5$ cm at more than 7.5 cm from the point of impact be between 40 and 350, that no fragment have surface area of greater than 3 cm$^2$ if not generated within a radius of 7.5 cm of the point of impact, and that no fragment of an elongated shape exist the length of which is greater than 7.5 cm.

Customarily, in order to render glass sheets more resistant so as to meet the regulations, the sheets are heated to a temperature approaching the glass softening temperature, and are then rapidly cooled by blowing air onto the two faces of each sheet simultaneously, the air speed being on the order of 200 m/s and the mass flow rate of the air being very high (possibly attaining 1200 Nm$^3$ per m$^2$ (Nm$^3$ being m$^3$ at standard temperature and pressure) of glass surface per minute.

Various techniques have been tried aimed at improving the effectiveness of this process, namely by improving the rate of cooling of the glass (which favors the mechanical characteristics desired). The cooling generates temperature gradients between the interior center and the surface of the glass, such gradients extending through the entire thickness of the glass sheet, which gradients continue during the time the glass is cooled through its annealing point, whereby permanent compressive stresses are established in the surface layers of the glass sheet, and lateral stresses develop which are compensated in the interior of the mass of the sheet.

One may, for example, increase the mass flow rate of the air without greatly increasing the nozzle pressure, but this is limited by the problem of setting the dimensions of the panes treated and the parameters of the evacuation of the air blown onto the panes, which evacuation must be carried out without perturbing the blowing action. It is necessary to have sufficient free surface in the installation to allow evacuation of the blast air and the heat picked up by it at the glass. In current installations, where the glass-support equipment and the blowing nozzles together occupy a substantial amount of surface, an increase in the flow rate, which is accompanied by an increase in the space claimed by the nozzles and the blast air itself, still further reduces the space available for evacuation, and is detrimental to cooling efficiency and effectiveness.

The technique has also been tried of varying the air jets in time and space (pulsation of the flow, oscillation of the blowing apparatus, etc.), and also that of intensifying the blowing in certain zones of the sheet surface, e.g., alternating bands of strong cooling with bands of less intense cooling. However, this introduction of additional complexity into the means employed has resulted only in a reduction in the number of needles after breakage of the pane, namely the number of fragments over 7.5 m long, and has not resulted in improvement in the other parameters governed by Regulation No. 43.

Finally, given the approximate proportionality between the heat transfer from the glass being cooled to the air and the velocity of that air, the technique has been tried of increasing the supply pressure of the blowing nozzles with the aim of increasing the air velocity. In this connection, pressures have been employed which are associated with sonic or even supersonic velocities. However, this entails a substantial increase in energy consumption, due to the inevitable high pressure drop in particular; and manufacturing costs are increased to a degree inconsistent with industrial feasibility.

Another consideration is the continuing current effort to reduce the weight of vehicles, which logically may be accomplished by employing thinner panes, namely about 3 mm thick or less. In order to ensure the proper mechanical characteristics of such panes, it is necessary to further intensify cooling, and thus to develop more powerful and effective methods of quenching or tempering.

SUMMARY OF THE INVENTION

Accordingly, an object of the present invention is to increase the rate of cooling of the glass in the quenching or tempering process, while avoiding the drawbacks of the abovementioned methods. In particular, the present invention is applicable in the case of relatively thin glass sheets, with thickness less than about 3 mm.

This object is achieved according to the invention in that a mixture is blown over the glass, which mixture has a specific heat which is higher than that of the gaseous jets, generally comprised of air, which are customarily used. Such a mixture when blown with a pressure such that it arrives at the glass with approximate sonic velocity, can achieve more rapid transfer of heat from the glass, and thus more rapid cooling of the glass, whereby the mechanical characteristics of the pane are improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic representation of the arrangement within a corresponding horizontal quenching or tempering apparatus.

FIG. 3a is a schematic longitudinal cross-section of a Laval nozzle.

DETAILED DESCRIPTION OF THE PREFERRED EMBODIMENTS

Figure 1:
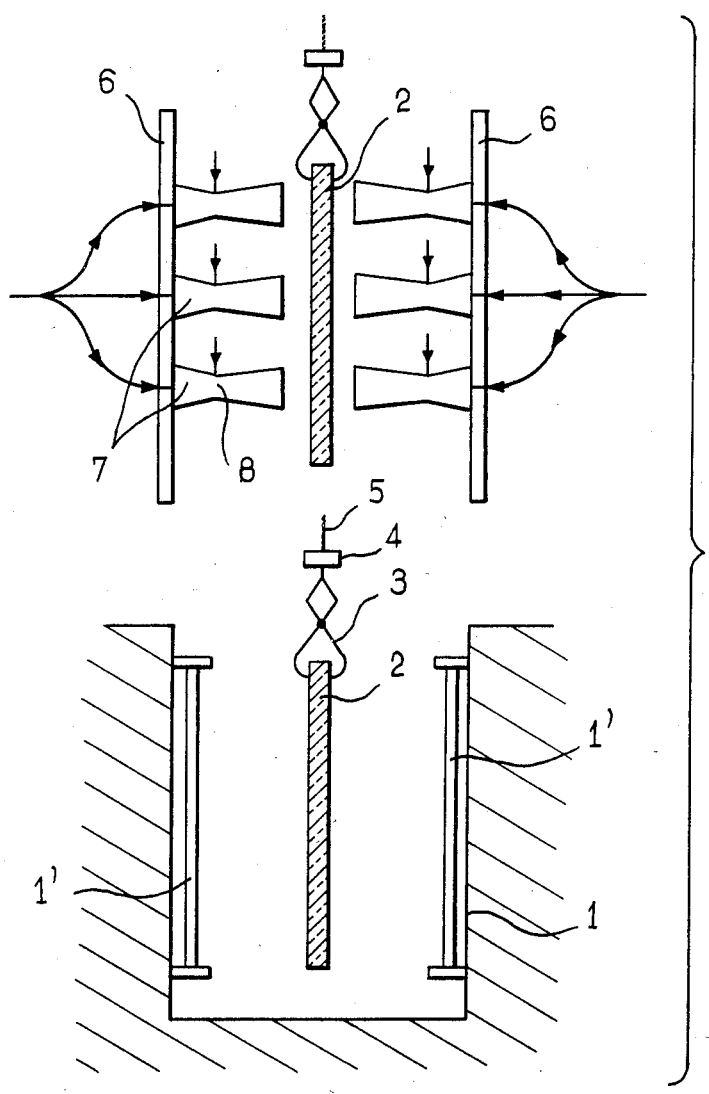
FIG. 1 is a schematic representation of the arrangement within a vertical quenching or tempering apparatus for glass sheets, which apparatus employs an inventive two-phase jet for blowing.

According to the invention, a gaseous jet, generally comprised of air and a liquid, is blown onto the glass, under conditions which do not risk perturbing the flow or damaging the pane, with a pressure such that the two-phase jet arrives at the glass with approximately sonic velocity.

According to a preferred embodiment of the invention, the liquid employed is water, which is blown with the gas onto the glass while in a finely divided state, which may be an atomized state wherein the liquid drops formed by the atomization are extremely fine.

There are various constraints which must be taken into account in order to achieve proper operation of the inventive method. At the exit of the furnace, just prior to quenching, the glass has a temperature on the order of 650° C., at which it is particularly fragile. If any drop of liquid comes into contact with the glass at this temperature it will cause the glass to break.

In particular, in the case of application of the inventive method to horizontal quenching of glass sheets, there is a risk that droplets will coalesce onto or stream in uncontrolled fashion onto the glass. Thus in order to avoid all surface contact between the glass and the liquid, care must be taken that the liquid be in finely divided or even atomized form, uniformly distributed in the gas. Accordingly, according to the invention the liquid is atomized. In order to avoid the two risks mentioned above in this paragraph, it is advantageous according to the invention to operate short of the wetting (not dewpoint) regime, and, for improved efficiency, to operate at the boundary of the wetting and non-wetting regimes.

The inventive process enables the glass sheets to be disposed farther away from the nozzles than the prior art in carrying out the quenching or tempering, due to the high heat transfer coefficient between the glass and the jet directed against the glass. This coefficient is increased partly by the presence of the liquid particles and partly by the increased velocity of the jet.

Various means may be employed to atomize the liquid. For example, a blowing nozzle for gaseous jets may be employed wherein the gas enters tangentially to the nozzle and then is caused to undergo a turbulent movement. The liquid is then distributed within this turbulent field, where it is atomized.

It has been discovered that a particular nozzle type called a "Laval nozzle" has a configuration which is particularly suitable for carrying out the inventive method. Accordingly, the invention also relates to an apparatus for carrying out the inventive method, wherein the blowing means comprise Laval nozzles. This type of nozzle is characterized in that it has the shape of a double cone, the first converging and the second diverging. Hydrodynamic calculations in the transonic regime show that at the throat of the nozzle, i.e., the junction between the convergent cone and the divergent cone which extends from the convergent cone, a shock wave is formed.

Such a nozzle has a certain number of advantages for carrying out the inventive method. It is not necessary to conduct the atomization of the liquid and the formation of a gaseous flow separately. By proper choice of the location of injection of the liquid, one takes direct advantage of the formation of the shock to achieve atomization of the liquid.

In passing through this shock, the liquid is subjected to a very sudden and large pressure change, and is literally atomized.

Advantageously according to the invention, the liquid is fed at a location slightly ahead of the location where the shock wave is produced. The liquid is practically immediately atomized, and the atomized gas-liquid mixture passes through its trajectory in the nozzle without substantial further pressure loss and is then ejected from the nozzle at approximately sonic velocity, thereby providing optimum conditions for cooling the glass.

Between the location of formation of the shock and the exit of the nozzle, the gas-liquid mixture becomes atomized and at the same time well-mixed, which further reduces the risk of damage to the glass.

Referring now to the drawings, wherein like reference numerals designate identical or corresponding parts throughout the several views, and more particularly to FIG. 1 thereof, in which the arrangement shown in FIG. 1 is of the classical type, comprising a furnace 1 for heating a glass sheet 2 which is then to be quenched or tempered. The sheet 2 is carried by means of tongs 3 suspended from a bar 4 which in turn is suspended by means of wires or the like 5 from a suitable known means of hoisting.

The sheet 2 is heated in furnace 1 while suspended from bar 4. The heating is accomplished by radiation from heating elements 1' mounted on opposite walls of the furnace 1 and facing the sheet 2.

At the exit of the furnace, the sheet 2 is carried, by translational movement of the bar, into a still vertical position in the quenching or tempering station. During this transfer the sheet is held continuously by the tongs 3. The quenching or tempering station is comprised of high pressure headers 6 equipped with gas supply lines connected to a supply (not shown) of pressurized gas, which gas may be ordinarily air. The headers are also furnished with a certain number of nozzles 7 into which (FIG. 4) pressurized gas and liquid are introduced in such a way as to obtain a two-phase mixture suitable for the invention in the zone of the nozzle throat as previously discussed.

The nozzles 7 are of the type represented in FIG. 3. They are formed by molding polyurethane around a core in the form of the interior of the nozzle, which core is customarily comprised of brass material.

Figure 3B:
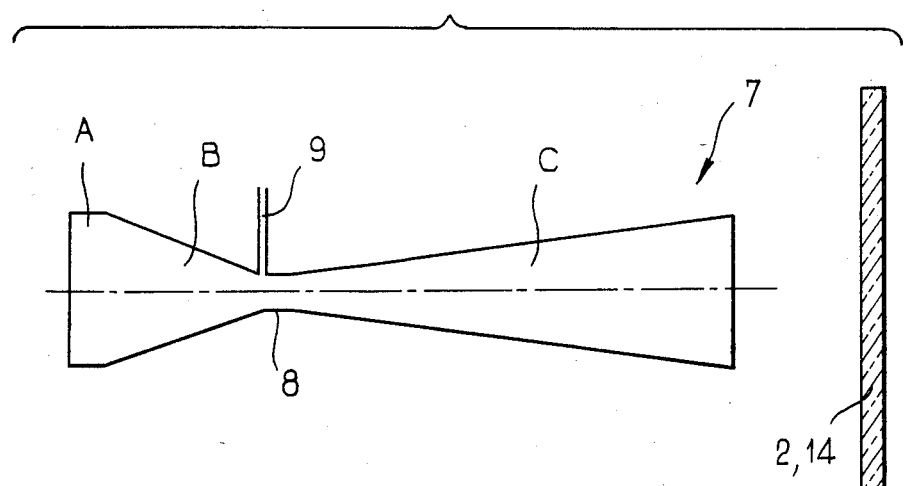
FIG. 3b is a side view of a Laval nozzle.

The nozzle shown in FIGS. 3a and 3b comprises a first, cylindrical part A of diameter 11 mm and length 10 mm. Then the cylinder is narrowed through a convergent cone B of length 20 mm, to a cylinder of diameter 4 mm and length 5 mm corresponding to the throat of the nozzle. The throat extends into a divergent cone C of length 60 mm and base diameter 11 mm (equal to the diameter of the initial cylinder). A tube or duct 9 of internal diameter on the order of 0.8 mm opens out into the nozzle passage in the zone of the throat, to permit injection of the liquid. The dimensions given are by way of example and do not limit the invention.

A plurality of nozzles 7 of this type may be disposed variously on the headers 6, depending on the dimensions of the glass sheets which are to be quenched or tempered. Due to the divergent angle of the opening of the nozzle at the outlet end from which the jet is directed against the glass, a larger surface area of impact is obtained than with the usual devices. This enables fewer nozzles to be employed. Further, good uniformity of quenching or tempering is assured.

Figure 4:
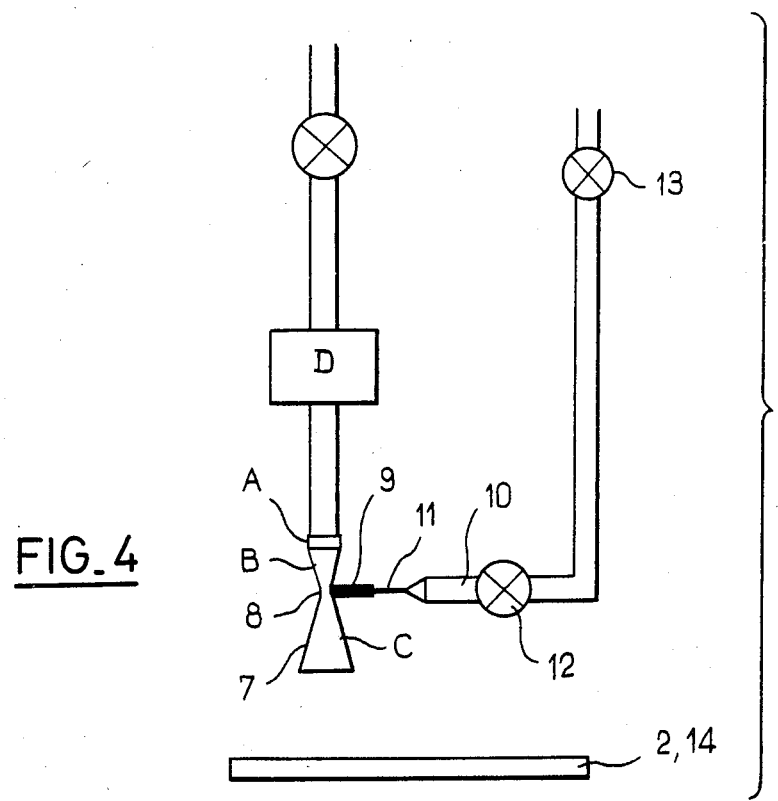
FIG. 4 illustrates an exemplary embodiment of an arrangement enabling formation of a two-phase jet.

FIG. 4 shows schematically the arrangement whereby the mixture is formed which mixture comprises gas (e.g., ordinarily air) and finely divided liquid.

When the two-phase jet is directed onto the glass, the unatomized liquid is injected in the zone of the nozzle throat 8 with the aid of an injector 10 and a needle 11 having an exterior diameter of, e.g., 0.8 mm for the case of a nozzle dimensioned as above. In order to regulate the liquid flow rate with the maximum possible precision, so as to operate at the extremum of the non-wetting regime, it has been found to be advantageous to dispose a regulator valve 12 as close as possible to the nozzle in the liquid supply line. The liquid is injected transversely to the nozzle axis.

In order to enable sonic ejection velocity of the two-phase mixture, it is advisable to supply gas to the nozzles under a relative pressure of at least about 0.910 bar, which is the pressure required to generate a shock wave in the nozzle illustrated. For convenience of control, and given that a shock is also generated with pressure slightly greater than 0.910 bar, it is chosen to supply the nozzles with gas at 1 bar. While it is also possible to generate a supersonic velocity at the nozzle exits by supplying the nozzles with gas at a higher pressure, it is preferable, in order to avoid excess energy consumption and to prevent formation of multiple shock waves which have the potential to interact, that one merely attempt to generate a transonic velocity, wherewith the relative pressure at which the headers 6 and nozzles 7 is supplied is limited to about 1 bar. The liquid should be introduced at a pressure greater than that of the gas. At the moment at which it arrives at the shock wave the liquid is finely divided in the form of a mist of particles of diameter on the order of 1 micron (for each particle); this is referred to as being "atomized".

Such a two-phase jet may be applied in quenching or tempering glass plates held vertically. The following is a description of an example of vertical quenching or tempering.

The gas is air and the atomized liquid is water. The quenching or tempering station of FIG. 1 is accordingly disposed as close as possible to the tempering furnace 1. A glass sheet 2 of thickness 2.9 mm leaves the furnace at a temperature of about 650° C., being lifted by, e.g., the gripping and holding system 3 and 4, and is positioned vertically between the nozzles 7. The distance between the glass and the end of the nozzles is about 60 mm to 80 mm, preferably 70 mm. Air under 1 bar pressure is injected axially into the nozzles, and water is injected radially at a flow rate of about 1.1 liter/hr per nozzle. A water supply valve 13 supplies water from an ordinary distribution system. Compressed air is ordinarily supplied at a pressure of about 6 bar. Accordingly, a reducing valve D (FIG. 4) is provided which enables a transition from 6 bar to 1 bar from an ordinary compressed air line tap.

Under the conditions of this example, the advantages of a two-phase jet have been demonstrated in comparison to a simple transonic air jet, by way of comparison of the heat transfer coefficients for the same incident air (i.e., air supply) pressure.

To quantify the improvement attributable to the two-phase jet, the glass temperature was plotted over the course of cooling carried out by a single nozzle directed at a glass sample $100 \times 100 \times 2.9$ mm with the water supply being first turned on and then turned off.

For this (i.e., the temperature plotting), a cylinder of hot bronze, the axis of which is a continuation of the axis of the nozzle, was employed. Three thermocouples connected to a recorder were introduced into the well of this temperature probe. At each measurement point in time, a plurality of measurements was taken at various locations along the axis of the cylinder, to establish a mean value which represented the heat transfer being studied.

Relating the temperature values obtained from the thermocouples to heat transfer coefficients (HTC) via the Fourier equation, the following results were obtained:

For two-phase jet, HTC = 0.0602 cal/m$^2$/°C./sec.
For simple jet, HTC = 0.0036 cal/m$^2$/°C./sec.

Thus the two coefficients differ by a factor of 16, which indicates the considerable advantage of the two-phase jet and thus of the quenching or tempering method according to the invention.

Two-phase jets may also be employed to quench or temper glass plates disposed horizontally. The following is a description of an example of horizontal quenching or tempering.

Here the apparatus illustrated in FIG. 2 is employed. Glass sheets 14 delivered at 650° C. by the heating furnace 15 are transported horizontally into the quenching or tempering station 16 on support rollers 17 borne on a lower frame 18. An upper frame 19 the height of which above the lower frame is controllable is also equipped with rollers 20 for holding the glass sheets. In operating position, the upper frame 19 is lowered as shown in FIG. 2, leaving between the lower rollers 17 and the upper rollers 20 only that space necessary for the passage of the glass sheets 14, whereby the upper rollers 20 will hold the said glass sheets which have been inserted on the lower rollers 17. The blowing nozzles 7 are interposed between the rollers and disposed facing the two faces of the glass sheets. The supply of gas and liquid to the nozzles is analogous to that described in connection with FIG. 1.

As in the preceding example, in the heat transfer test the apparatus was operated just short of the wetting regime.

The quantities of water injected may be the same as in the example of vertical quenching or tempering.

In the examples described the nozzles 7 were disposed directed at both faces of the glass sheets or plates; alternatively, nozzles 7 may be provided only opposite one face.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of quenching or tempering a glass sheet which comprises directing a jet comprising a gas and liquid onto at least one face of said glass sheet by means of a nozzle where said gas is supplied at a sufficient pressure to produce a jet velocity which is at least sonic at the exit of said nozzle, said liquid being atomized prior to exiting said nozzle.

2. The method of claim 1 wherein said liquid is atomized by passing through a shock wave produced in the interior of said nozzle.

3. The method of claim 2 wherein the liquid is introduced upstream of the location of the shock wave.

4. The method of claim 3 wherein the flow rate of the liquid is controlled so that said jet is maintained between wetting and non-wetting of the glass article.

5. The method of claim 1 wherein the nozzle is supplied with a gas at a pressure of at least about 0.910 bar.

6. The method of claim 5 wherein said pressure is measured above back pressure.

7. The method of claim 1 wherein said liquid comprises water.

8. The method of claim 1 wherein said gas comprises air.

9. The method of claim 1 wherein said liquid has a flow rate of about 1.1 liters/hr per nozzle.

10. The method of claim 1 wherein said method is applied to a vertical quenching or tempering of said glass sheet.

11. The method of claim 10 wherein a distance of about 60 mm to 80 mm is maintained between an end of said nozzle and said glass sheet.

* * * * *